(12) United States Patent
Ogawa et al.

(10) Patent No.: US 6,763,908 B2
(45) Date of Patent: Jul. 20, 2004

(54) STEERING DEVICE FOR A VEHICLE

(75) Inventors: Kenji Ogawa, Tokyo (JP); Kazushi Shirasawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/301,781

(22) Filed: Nov. 22, 2002

(65) Prior Publication Data

US 2003/0150666 A1 Aug. 14, 2003

(30) Foreign Application Priority Data

Feb. 14, 2002 (JP) ....................................... 2002-036257

(51) Int. Cl.[7] .............................................. B62D 5/04
(52) U.S. Cl. ......................... 180/446; 180/443; 701/41; 701/42
(58) Field of Search ................................ 180/443, 444, 180/446, 402, 403; 701/41–43

(56) References Cited

U.S. PATENT DOCUMENTS

| | | | | |
|---|---|---|---|---|
| 6,079,513 | A | * | 6/2000 | Nishizaki et al. ............ 180/402 |
| 6,239,568 | B1 | * | 5/2001 | Sugitani et al. ............. 318/466 |
| 6,360,151 | B1 | * | 3/2002 | Suzuki et al. ................. 701/41 |
| 6,370,460 | B1 | * | 4/2002 | Kaufmann et al. ........... 701/41 |
| 6,389,342 | B1 | * | 5/2002 | Kanda ........................... 701/41 |
| 6,445,987 | B1 | * | 9/2002 | Kurishige et al. ............ 701/41 |
| 6,449,542 | B1 | * | 9/2002 | Bottiger et al. ............... 701/41 |
| 6,505,703 | B2 | * | 1/2003 | Stout et al. .................. 180/446 |
| 6,580,989 | B1 | * | 6/2003 | Husain et al. ................. 701/41 |

FOREIGN PATENT DOCUMENTS

| | | |
|---|---|---|
| DE | 100 13 711 A1 | 10/2001 |
| DE | 102 24 758 A1 | 6/2003 |
| JP | 2001-088727 | 4/2001 |
| JP | 2003-154951 A | 5/2003 |

OTHER PUBLICATIONS

U.S. patent application Ser. No. 10/136,382, filed May 2, 2002.

* cited by examiner

*Primary Examiner*—Lesley D. Morris
*Assistant Examiner*—L. Lum
(74) *Attorney, Agent, or Firm*—Sughrue Mion, PLLC

(57) ABSTRACT

A steering device for a vehicle has: a target wheel steering angle production unit for producing a target wheel steering angle on the basis of a detected steering wheel angle; a wheel steering angle control unit for controlling steering angles of wheels turned for steering so that a detected wheel steering angle and a target wheel steering angle coincide with each other; a target reaction production unit for producing a target reaction on the basis of the steering wheel angle; a first reaction torque control unit for controlling a reaction torque produced in the steering wheel by driving a reaction control mechanism so that the reaction torque and the target reaction coincide with each other; and a second reaction torque control unit for compensating an output from the wheel steering angle control unit so that the reaction and the target reaction torque coincide with each other.

4 Claims, 11 Drawing Sheets

STEERING DEVICE FOR A VEHICLE

BACKGROUND OF THE INVENTION

1. Field of the Invention

The present invention relates to a steering device for a vehicle, and more particularly, to a steering device having a sub-steering mechanism that is required upon conducting automatic steering for compensating a steering amount of a steering wheel performed by a driver, or required for steering upon the automatic driving, for example.

2. Description of the Related Art

Control methods relating to steering of vehicles have been proposed in which, for example, auxiliary automatic control of the direction of wheels is performed so as to optimize steering characteristics, i.e., change in an actual traveling direction of a vehicle with respect to the amount of turning of a steering wheel, or an automatic control operates instead of operation by a driver to drive and control a steering system so that a running position of a vehicle is within a predetermined lane.

The applicant of the present invention filed an application for a patent for a steering device for a vehicle such as shown in FIG. 11 (Japanese Patent Application No. 2001-353130) to perform this kind of wheel steering angle control for a vehicle.

The conventional steering device for a vehicle will be described with reference to FIG. 11 showing a construction of the device.

In FIG. 11, a steering wheel operated by a driver is indicated by reference numeral 1 and a first planetary gear mechanism is indicated by reference numeral 2. The first planetary gear mechanism 2 is constituted by a sun gear 201 connected to the steering wheel 1, planetary gears 202a and 202b supported by a carrier 203, a ring gear 204, and a worm wheel 205 for rotating the ring gear 204.

A second planetary gear mechanism indicated by reference numeral 3 in FIG. 11 is also provided. The second planetary gear mechanism 3 is constituted by a sun gear 301, planetary gears 302a and 302b supported on a carrier 303, and a fixed ring gear 304. A shaft indicated by reference numeral 4 connects the carrier 203 of the first planetary gear mechanism 2 and the carrier 303 of the second planetary gear mechanism 3 to each other. The first planetary gear mechanism 2 or the combination of the first planetary gear mechanism 2 and the second planetary gear mechanism 3 is a sub-steering mechanism capable of mechanically adding an auxiliary steering angle to a turning angle of the steering wheel 1.

A rack-and-pinion steering mechanism indicated by reference numeral 5 in FIG. 11 is also provided. The rack-and-pinion steering mechanism 5 is constituted by a rack-and-pinion 501, and a worm wheel 502 capable of reversing the rotation direction and that is used to rotate the pinion 501 with an electric motor 901 used as a wheel steering angle control actuator. Knuckle arms are indicated by reference symbols 6a and 6b, and wheels to be turned for steering are indicated by 7a and 7b.

A reaction control mechanism indicated by reference numeral 8 in FIG. 11 is a mechanism for giving the steering wheel 1 a reaction torque by applying a drive torque to the first planetary gear mechanism 2 operating as the sub-steering mechanism. The reaction control mechanism 8 is constituted by a reaction motor 801 for applying the drive torque to the first planetary gear mechanism 2, and a worm gear 802 which meshes with the worm wheel 205 of the first planetary gear mechanism 2. The worm gear 802 cannot be rotated by the rotation of the worm wheel 205. That is, the reaction mechanism can be self-locked.

A wheel steering angle control mechanism indicated by reference numeral 9 in FIG. 11 is a mechanism for driving the steering mechanism 5. The wheel steering angle control mechanism 9 is constituted by an electric motor 901 and a worm gear 902 which meshes with the worm wheel 502 of the steering mechanism 5. The combination of the worm wheel 502 and the worm gear 902 is such that the worm gear 902 can be rotated from the worm wheel 502 side, that is, it can be reversely rotated.

A reaction torque detection means for detecting the reaction torque produced at the steering wheel 1 is indicated by reference numeral 10 in FIG. 11. A wheel steering angle detection means 11 for detecting the wheel steering angle of the wheels turned for steering 7a and 7b and a steering wheel steering angle detection means 12 for detecting the steering angle of the steering wheel 1 are also provided.

A target wheel steering angle production means is indicated by reference numeral 13 in FIG. 11. The target wheel steering angle production means 13 produces a target wheel steering angle 1301 by computing a necessary wheel steering angle, for example, from an output 1201 from the steering wheel steering angle detection means 12, a steering request 20 from another system (e.g., a lane keeping device), and a vehicle state signal 21 (e.g., a vehicle speed signal, a yaw rate signal, or the like).

A wheel steering angle control means is indicated by reference numeral 14 in FIG. 11. The wheel steering angle control means 14 controls the wheel steering angle of the wheels turned for steering 7a and 7b by driving the wheel steering angle control electric motor 901 so that the target wheel steering angle 1301 and an output 1101 from the wheel steering angle detection means 11 are equal to each other.

A target reaction production means for setting a target value of the reaction torque received by the driver through the steering wheel 1 is indicated by reference numeral 15 in FIG. 11. The target reaction production means 15 computes a suitable reaction, for example, from the output 1201 from the steering wheel steering angle detection means 12 and the vehicle state signal 21 (e.g., a vehicle speed signal, a yaw rate signal, or the like) to produce a target reaction torque 1501.

Further, a reaction torque control means is indicated by reference numeral 16 in FIG. 11. The reaction torque control means 16 controls the reaction torque produced in the steering wheel 1 by driving the reaction electric motor 801 so that the target reaction torque 1501 and an output 1001 from the reaction torque detection means 10 are equal to each other.

As described above, the conventional device controls the wheel steering angle by computing a suitable wheel steering angle, for example, from the operation of the steering wheel 1 performed by the driver and a signal from another system, and simultaneously controls production of the steering wheel reaction in the steering wheel 1 by computing a suitable steering reaction.

However, if the wheel steering angle and the steering wheel reaction are independently controlled in the device having the above-described sub-steering mechanism, as shown in FIG. 2, a drive torque is required for the wheel steering angle control electric motor 9. That is, according to the balance about the wheel steering angle control electric motor (wheel steering angle control mechanism) 9, a drive torque (Ta+Tb) for a self-alignment torque (road surface reaction) Ta produced in the wheels turned for steering and a torque Tb distributed from the reaction electric motor 8 by the sub-steering mechanisms (planetary gear mechanisms) 2 and 3 is required of the wheel steering angle control electric motor 9.

On the other hand, according to the balance about the reaction electric motor (reaction control mechanism) 8, a drive torque (Tb+Tc) for a reaction torque Tc produced in the steering wheel 1 and Tb distributed by the sub-steering mechanisms 2 and 3, is required for the reaction electric motor 8.

Thus, the steering system using the above-described steering device has a problem in that it consumes a larger amount of energy in comparison with the ordinary power steering system. For ease of description, the gear ratios of the planetary gear mechanisms 2 and 3, the gear ratio of the steering mechanism 5, and so on have been shown in a converted state on one steering axis.

SUMMARY OF THE INVENTION

In view of the above-described problem of the conventional art, an object of the present invention is to provide a steering device for a vehicle which has a sub-steering mechanism, in which a wheel steering angle and a steering wheel reaction are controlled independently of each other, and in which energy consumption can be reduced.

To achieve the above-described object, according to the present invention, there is provided a steering device for a vehicle having: a steering wheel operated by a driver; a sub-steering mechanism for mechanically adding an auxiliary steering angle to a turning angle of the steering wheel; a steering mechanism for steering wheels turned for steering; a reaction control mechanism for giving the steering wheel a reaction torque by energizing the sub-steering mechanism with a drive torque; a wheel steering angle control mechanism for driving the steering mechanism; a reaction torque detection means for detecting the reaction torque produced in the steering wheel; and a wheel steering angle detection means for detecting wheel steering angles of the wheels turned for steering.

Further, the steering device for a vehicle having: a steering wheel steering angle detection means for detecting a steering wheel angle when the steering wheel is operated; a target wheel steering angle production means for producing a target wheel steering angle on the basis of the steering wheel angle detected by the steering wheel steering angle detection means; and a wheel steering angle control means for controlling the wheel steering angles of the wheels turned for steering by driving the wheel steering angle control mechanism so that the wheel steering angles detected by the wheel steering angle detection means and the target wheel steering angle produced by the target wheel steering angle production means coincide with each other.

In addition, the steering device for a vehicle having: a target reaction production means for producing a target reaction on the basis of the steering wheel angle detected by the steering wheel steering angle detection means; a first reaction torque control means for controlling the reaction torque produced in the steering wheel by driving the reaction control mechanism so that the reaction torque detected by the reaction torque detection means and the target reaction produced by the target reaction production means coincide with each other; a second reaction torque control means for compensating an output from the wheel steering angle control means so that the reaction torque detected by the reaction torque detection means and the target reaction produced by the target reaction production means coincide with each other; a reaction control limitation means for limiting an output from the first reaction torque control means on the basis of a limit value; and a limit range setting means for setting the limit value used by the reaction control limitation means.

The above-described steering device has the effect of reducing energy consumption.

DESCRIPTION OF THE PREFERRED EMBODIMENTS

Embodiment 1

Figure 1:
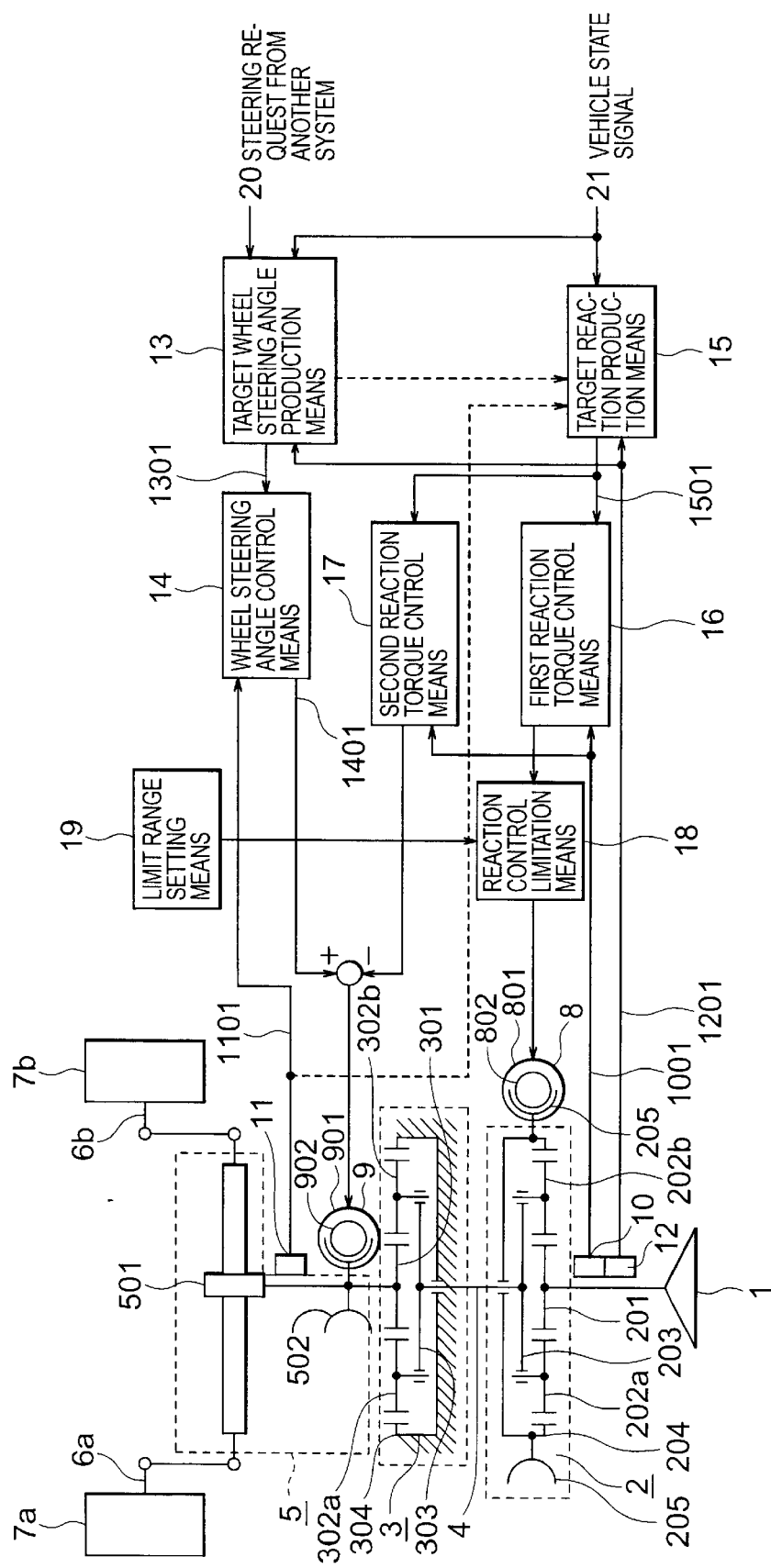
FIG. 1 is a diagram showing a construction of a steering device for a vehicle according to Embodiment 1 of the present invention.

A steering device for a vehicle in Embodiment 1 of the present invention will be described with reference to the accompanying drawings. FIG. 1 is a diagram showing a construction of the steering device for a vehicle according to Embodiment 1 of the present invention. Note that in FIG. 1, components identical or corresponding to those in the conventional arrangement are indicated by the same reference numerals and characters.

Illustrated in FIG. 1 are the same mechanisms, etc., as those relating to the above-described conventional steering device: a steering wheel 1; a first planetary gear mechanism 2; a second planetary gear mechanism 3; a shaft 4 which connects the first planetary gear mechanism 2 and second planetary gear mechanism 3; a steering mechanism 5; knuckle arms 6a and 6b; wheels 7a and 7b to be turned for steering; a reaction control mechanism 8; a wheel steering angle control mechanism 9; a reaction torque detection means 10; a wheel steering angle detection means 11; a steering wheel steering angle detection means 12; a target wheel steering angle production means 13; a wheel steering angle control means 14; a target reaction production means 15; a steering request 20 from another system; and a vehicle state signal 21. The descriptions of them will not be repeated.

A first reaction torque control means indicated by reference numeral 16 in FIG. 1 is provided. The first reaction torque control means 16 controls a reaction torque produced in the steering wheel 1 by driving the reaction electric motor 801 through a reaction control limitation means described below, so that the target reaction torque 1501 and the output 1001 from the reaction torque detection means 10 are equal to each other.

A second reaction torque control means indicated by reference numeral 17 in FIG. 1 is also provided. The second reaction torque control means 17 compensates a control output 1401 from the wheel steering angle control means 14 so that the target reaction torque 1501 and the output 1001 from the reaction torque detection means 10 are equal to each other.

The reaction control limitation means indicated by reference numeral 18 in FIG. 1 is further provided. The reaction control limitation means 18 outputs an output from the first reaction torque control means 16 while applying a certain limit to the output. The limit range setting means 19 is also provided. The limit range setting means 19 sets a limit range of the reaction control limitation means 18.

The operation of the steering device for a vehicle according to Embodiment 1 will be described with reference to the drawings.

Figure 2:
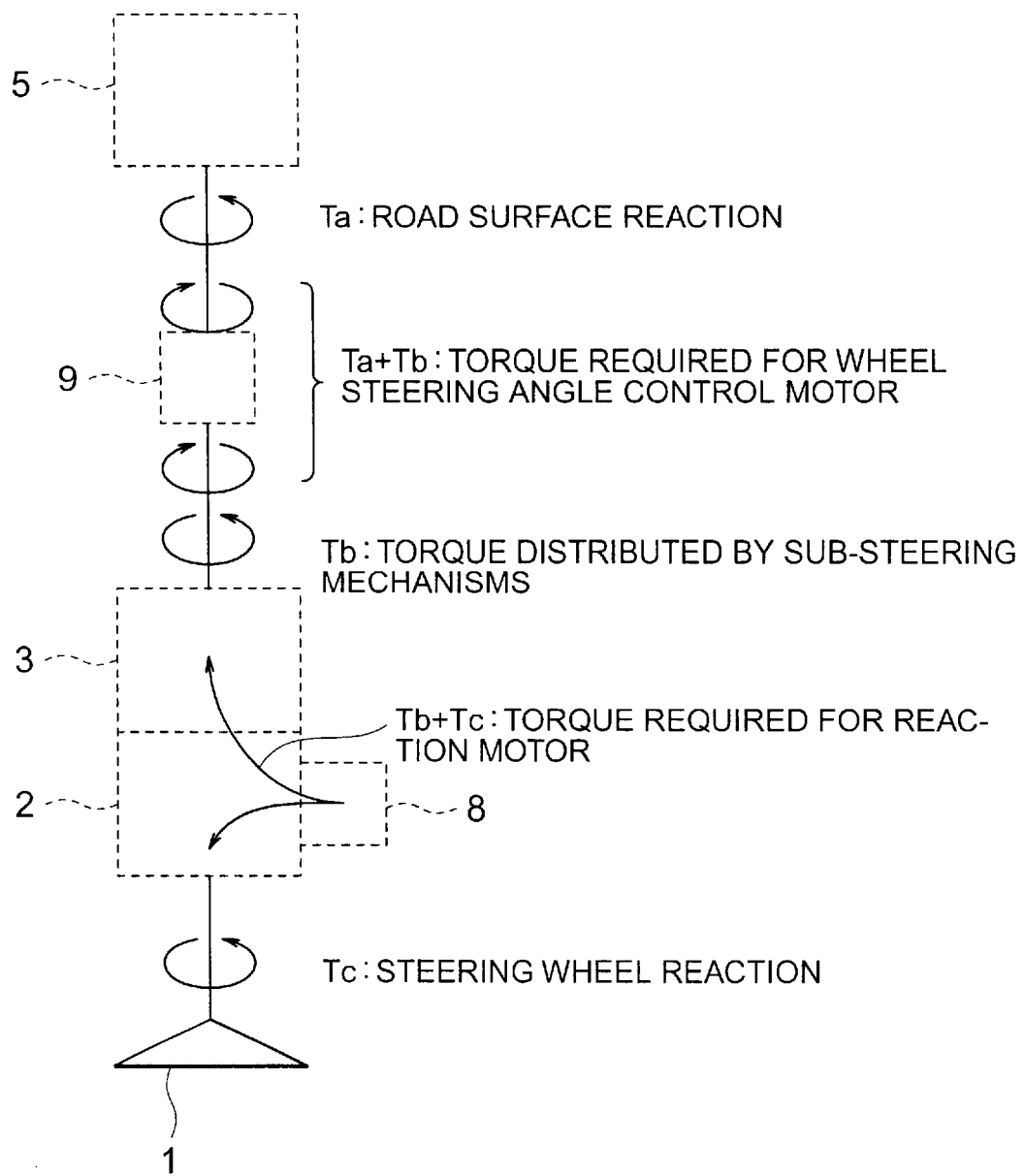
FIG. 2 is a diagram for explaining torque balance when reaction control is performed by using a sub-steering mechanism of the steering device for a vehicle according to Embodiment 1 of the present invention.
Figure 3:
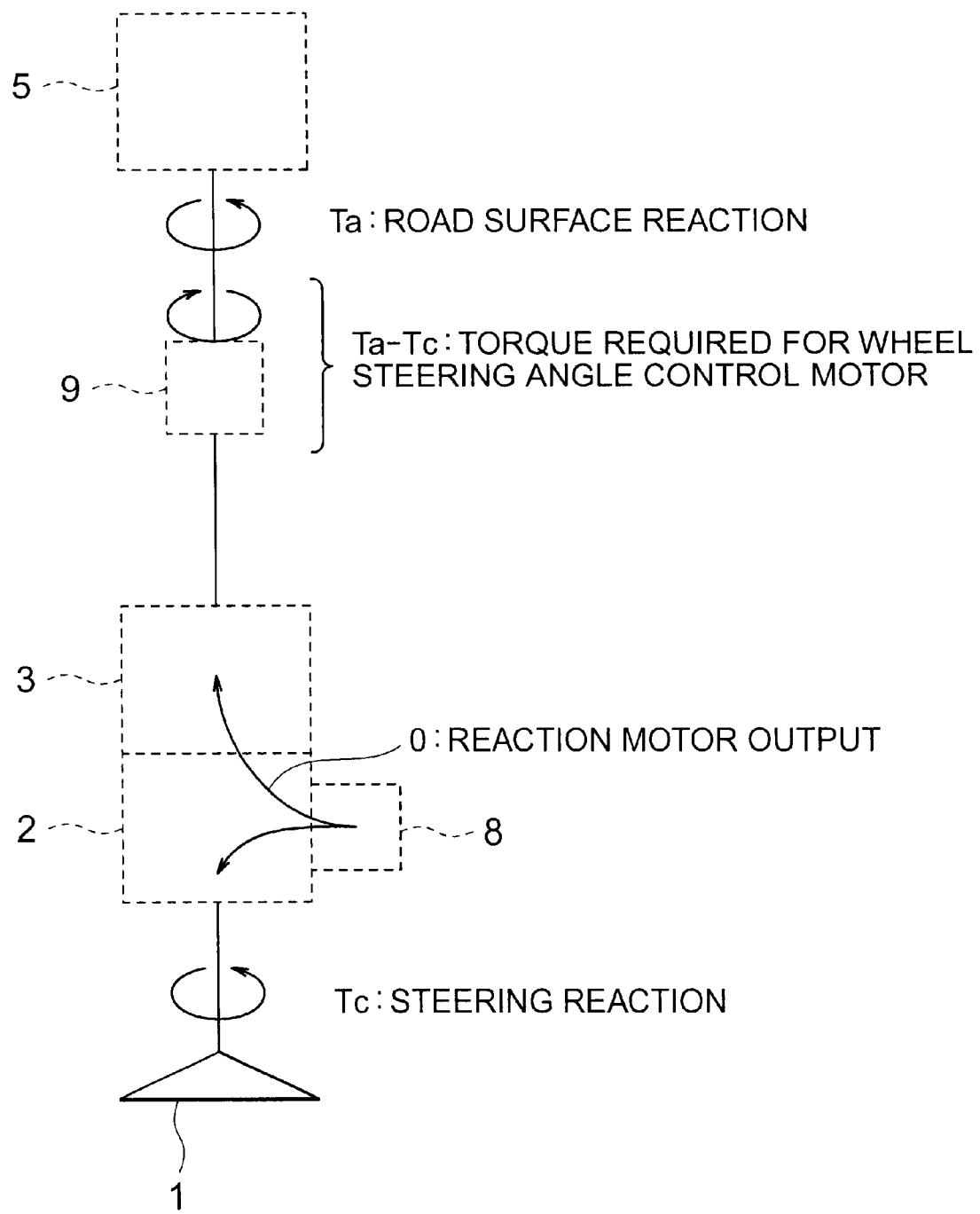
FIG. 3 is another diagram for explaining torque balance when reaction control is performed by using the sub-steering mechanism of the steering device for a vehicle in Embodiment 1 of the present invention.
Figure 4:
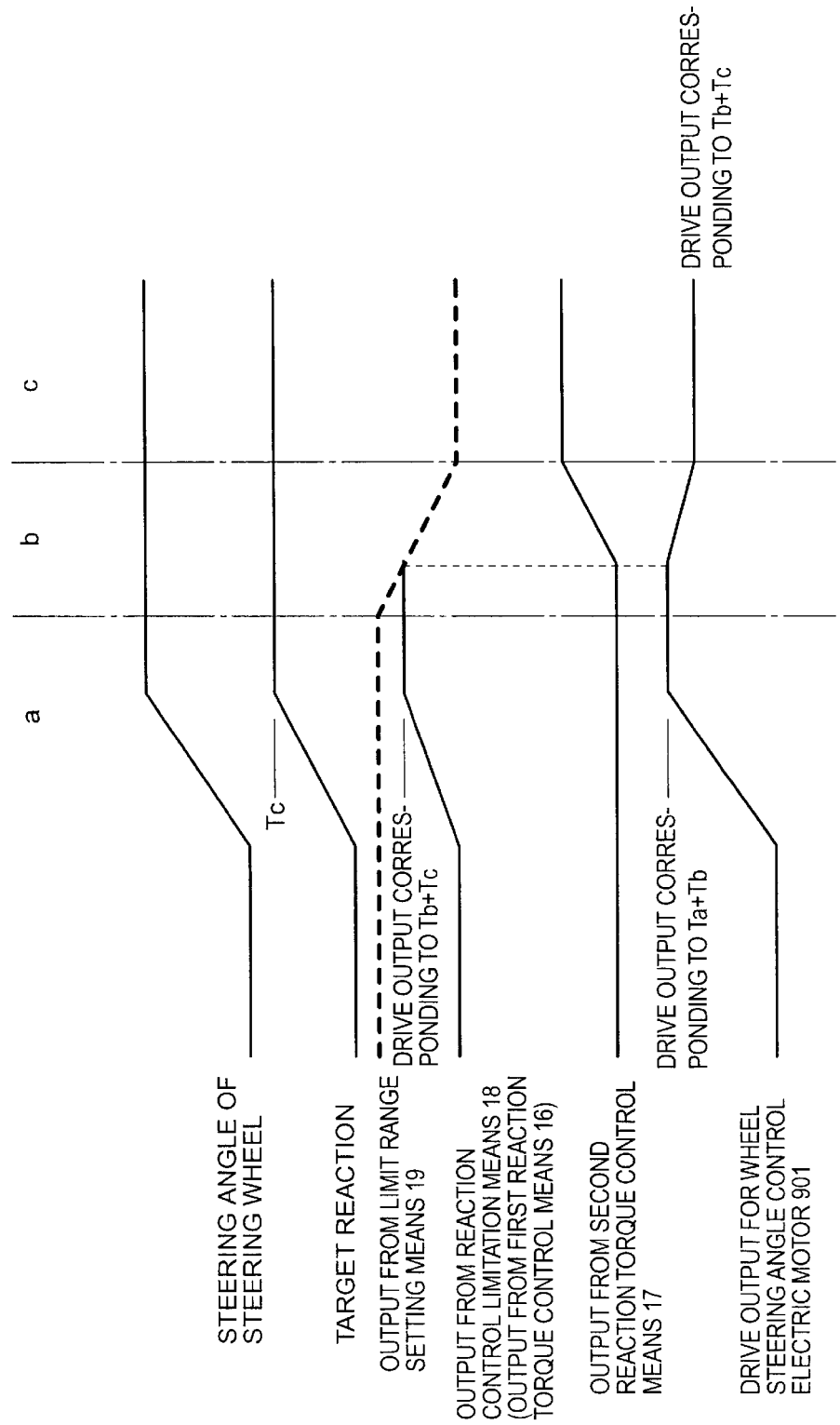
FIG. 4 is a timing chart showing an operation of the steering device for a vehicle according to Embodiment 1 of the present invention.

FIGS. 2 and 3 are diagrams for explaining torque balance achieved when the reaction control is performed by using a sub-steering mechanism of the steering device for a vehicle in Embodiment 1. FIG. 4 is a timing chart of an operation of the steering device for a vehicle in Embodiment 1 of the present invention.

FIG. 4 shows the operation in a situation where the steering wheel 1 is steered and then fixed at the steering angle while the vehicle is running.

Referring to a section a of FIG. 4 a control output issued from the first reaction torque control means 16 through the reaction control limitation means 18 is smaller than a limit value (broken line) set by the limit range setting means 19. The contents in the section a indicate that the reaction torque produced in the steering wheel 1 is controlled by the first reaction torque control means 16, and the compensating control output from the second reaction torque control means 17 with respect to a control signal from the wheel steering angle control means 14 is zero.

The first reaction torque control means 16 performs control so that a deviation between the target reaction output 1501 from the target reaction production means 15 and the reaction torque signal 1001 from the reaction torque detection means 10 is zero. Thus, the compensating control output from the second reaction torque control means 17 becomes zero.

That is, as shown in FIG. 2, a drive output corresponding to Ta+Tb is required for the wheel steering angle control electric motor 901, while a drive output corresponding to Tb+Tc is required for the reaction motor 801.

In a section b of FIG. 4, a state when the limit value (broken line) given to the reaction control limitation means 18 is gradually reduced by the limit range setting means 19 is shown. When the limit value is larger than the control output from the first reaction torque control means 16, the state of control is the same as that described above. However, when the limit value becomes smaller than the control output from the first reaction torque control means 16, the reaction control cannot be completed by the first reaction torque control means 16 alone.

That is, a deviation is caused between the target reaction 1501 from the target reaction production means 15 and the reaction torque signal 1001 from the reaction torque detection means 10. The second reaction torque control means 17 therefore operates to compensate the control output from the wheel steering angle control means 14 so that this deviation becomes zero.

The wheel steering angle control means 14 controls the wheel steering angle of the wheels turned for steering 7a and 7b by driving the wheel steering angle control electric motor 901 so that the target wheel steering angle 1301 and the output 1101 from the wheel steering angle detection means 11 are equal to each other, as described above with respect to the conventional steering device. Therefore, the wheel steering angle control electric motor 901 produces the torque commensurate with the entire self-alignment torque produced in the wheels turned for steering 7a and 7b.

That is, part of the self-alignment torque can be utilized as a steering wheel reaction if the drive torque applied to the wheel steering angle control electric motor 901 is reduced. Therefore, the output from the second reaction torque control means 17 is subtracted from the control output 1401 from the wheel steering angle control means 14 to reduce the deviation between the target reaction 1501 from the target reaction production means 15 and the reaction torque signal 1001 from the reaction torque detection means 10 to zero. Consequently, part of the self-alignment torque is applied to the steering wheel 1, thus completing reaction control.

In a section c of FIG. 4, a state when the limit value is set to zero by the limit range setting means 19 is shown. In this state, drive of the reaction electric motor 801 by the first reaction torque control means 16 cannot be performed; the reaction is controlled by means of the wheel steering angle control electric motor 901 alone.

Therefore the entire reaction produced in the steering wheel 1 corresponds to the self-alignment torque, as shown in FIG. 3. Thus, the torque required for the wheel steering angle control electric motor 901 is reduced from Ta+Tb to Ta−Tc, and the torque required for the reaction electric motor 801 is reduced from Tb+Tc to zero. Consequently, energy consumption is reduced.

That is, the reaction control limitation means 18 limits the control output from the first reaction torque control means 16 on the basis of the limit range set by the limit range setting means 19. Insufficiency of the drive torque of the reaction motor 801 required for control to the target reaction is caused thereby. Then, in order to obtain the insufficient reaction torque with respect to the target torque from the self-alignment torque of the wheels turned for steering 7a and 7b, the second reaction torque control means 17 performs compensating control so as to reduce the drive torque of the wheel steering angle control electric motor 901, thus reducing energy consumption.

Three methods of setting the limit value by the limit range setting means 19 will next be described successively.

Figure 5:
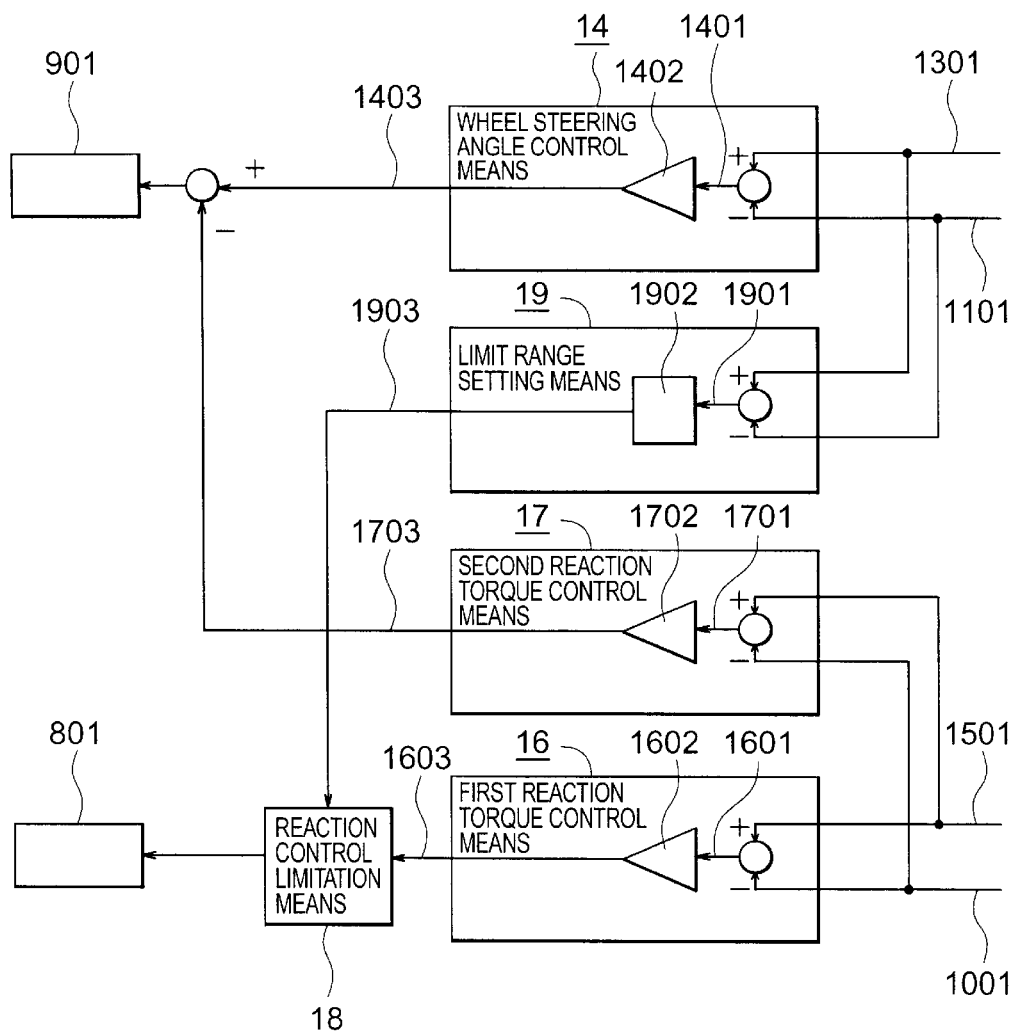
FIG. 5 is a diagram for explaining a first method of setting a limit value by a limit range setting means in the steering device for a vehicle according to Embodiment 1 of the present invention.
Figure 6:
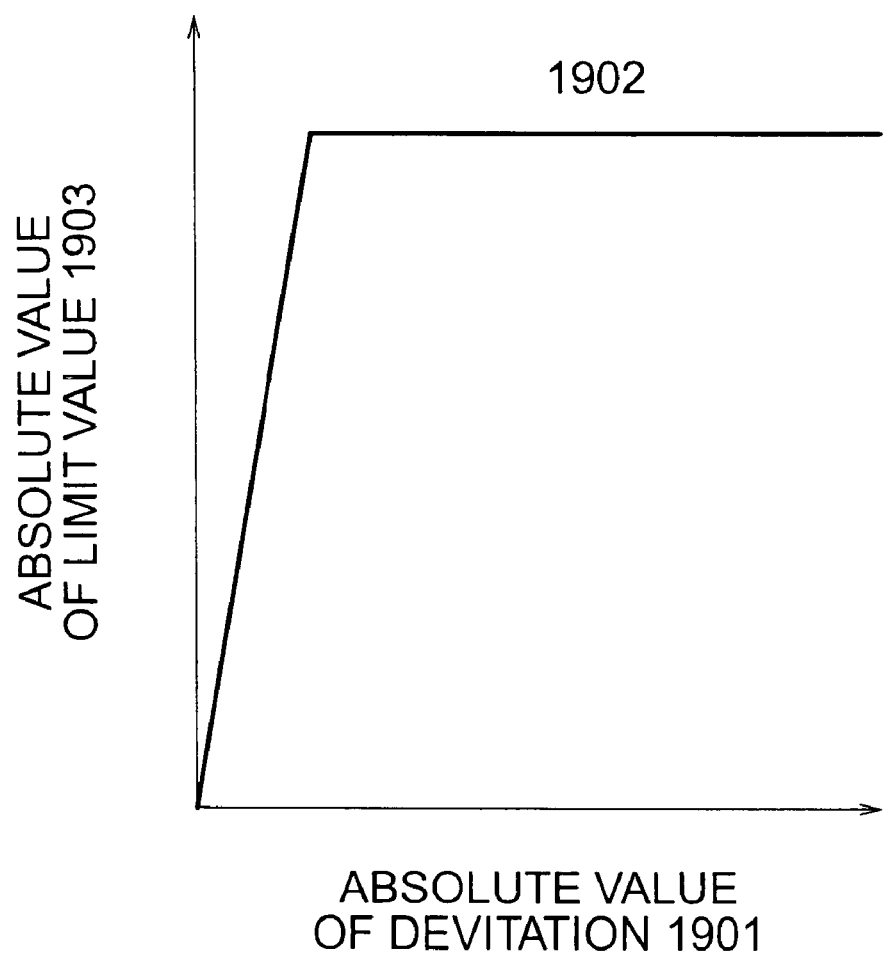
FIG. 6 is a diagram representing a limit range table used by the limit range setting means in the steering device for a vehicle in Embodiment 1 of the present invention.

FIG. 5 is a diagram for explaining a first method of setting the limit value by the limit range setting means 19 in the steering device for a vehicle. Further, FIG. 6 is a diagram representing a limit range table.

In the first method, the limit value is set according to the deviation between the target wheel steering angle 1301 and the wheel steering angle 1101.

Referring to FIG. 5, the wheel steering angle control means 14 is arranged to control the wheel steering angle control electric motor 901 by means of a controller 1402 such as a PID controller so that the deviation 1401 between the target wheel steering angle 1301 and the output 1101 from the wheel steering angle detection means 11 becomes zero.

Therefore, the deviation 1401 becomes larger when the target wheel steering angle 1301 is changed or when the output 1101 from the wheel steering angle detection means 11 is changed by an external perturbation or the like. Conversely, the deviation 1401 is close to zero when there is no such change and the state of the control is close to a steady state.

The first method is based on use of this characteristic. The limit range setting means 19 refers to a limit range table 1902 such as shown in FIG. 6 with respect to the absolute value of a deviation 1901 corresponding to the deviation 1401 and outputs the absolute value of a limit value 1903.

That is, if the deviation 1901 is larger, the larger limit value 1903 is set to perform reaction control as follows. The first reaction torque control means 16 controls drive of the reaction motor 801 by means of a controller 1602 such as a PID controller so that a deviation 1601 between the target reaction value 1501 and the output value 1001 of the reaction torque detection means 10 is zero.

At this time, the reaction is controlled by the first reaction torque control means 16, and thus, a deviation 1701 between the target reaction value 1501 and the output value 1001 in the second reaction torque control means 17 is zero. Correspondingly, the output from a controller 1702 such as a PID controller is also zero and a compensating control output 1703 for compensation of a control output 1403 from the wheel steering angle control means 14 is zero, thus limiting the influence of the second reaction torque control means 17 on the wheel steering angle control.

When the deviation 1901 is reduced, the above-described limit value 1903 is reduced and reaction control cannot be completed by the first reaction torque control means 16 alone.

That is, the absolute value of the deviation 1701 between the target reaction value 1501 and the output 1001 from the reaction torque detection means 10 in the second reaction torque control means 17 is increased to produce the compensating control amount 1703 for reducing the drive torque applied to the wheel steering angle control electric motor 901 by the controller 1702, thus completing reaction torque control.

Finally, when the deviation 1901 becomes zero, the output from the first reaction torque control means 16 for drive of the reaction motor 801 is shut off by the reaction control limitation means 18 and the reaction control is performed only by compensating control of the wheel steering angle control electric motor 901 performed by the second reaction torque control means 17. Thus, a state such as shown in FIG. 3 results and energy consumption is reduced.

Figure 7:
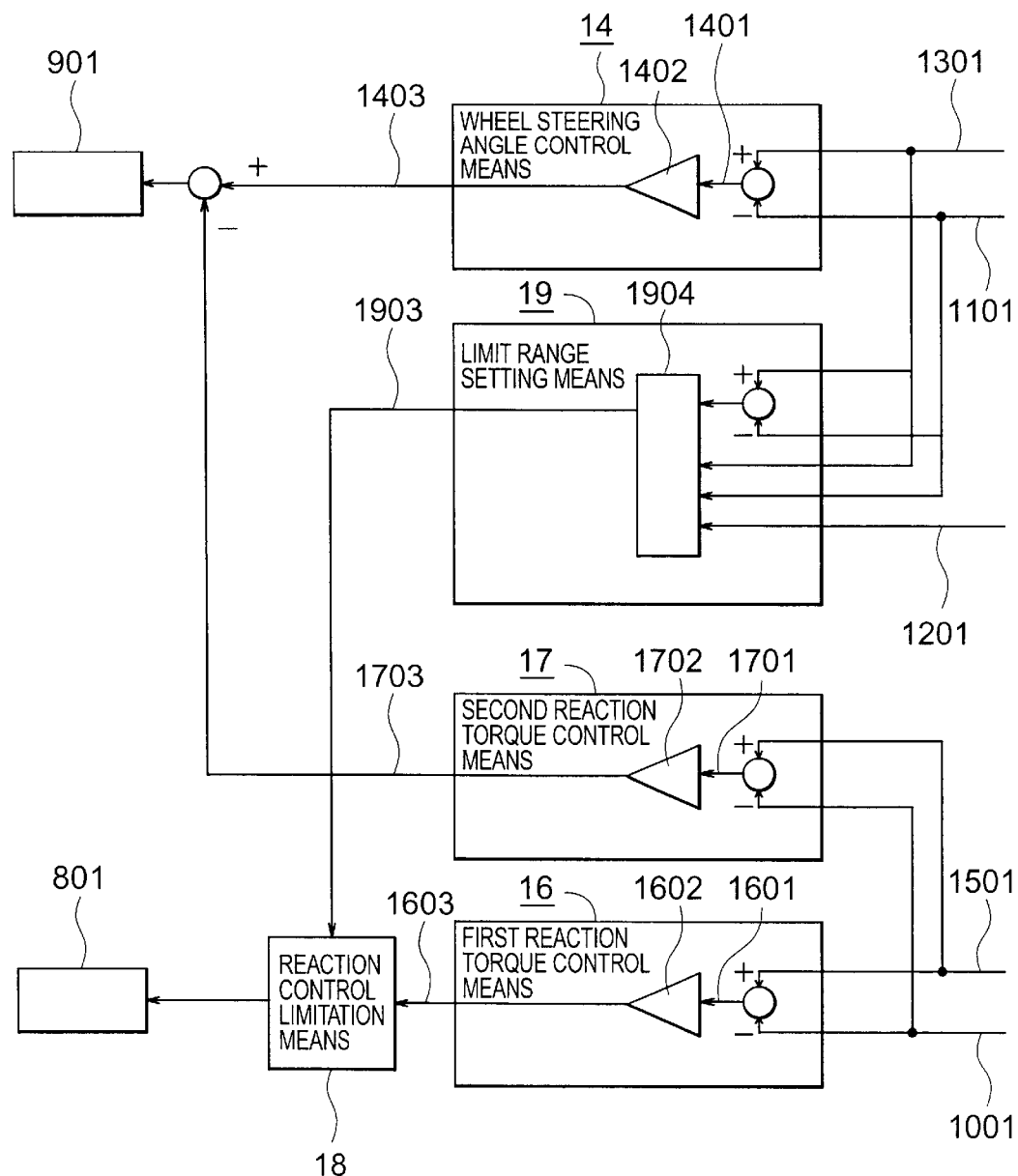
FIG. 7 is a diagram for explaining a second method using the limit range setting means in the steering device for a vehicle according to Embodiment 1 of the present invention.
Figure 8:
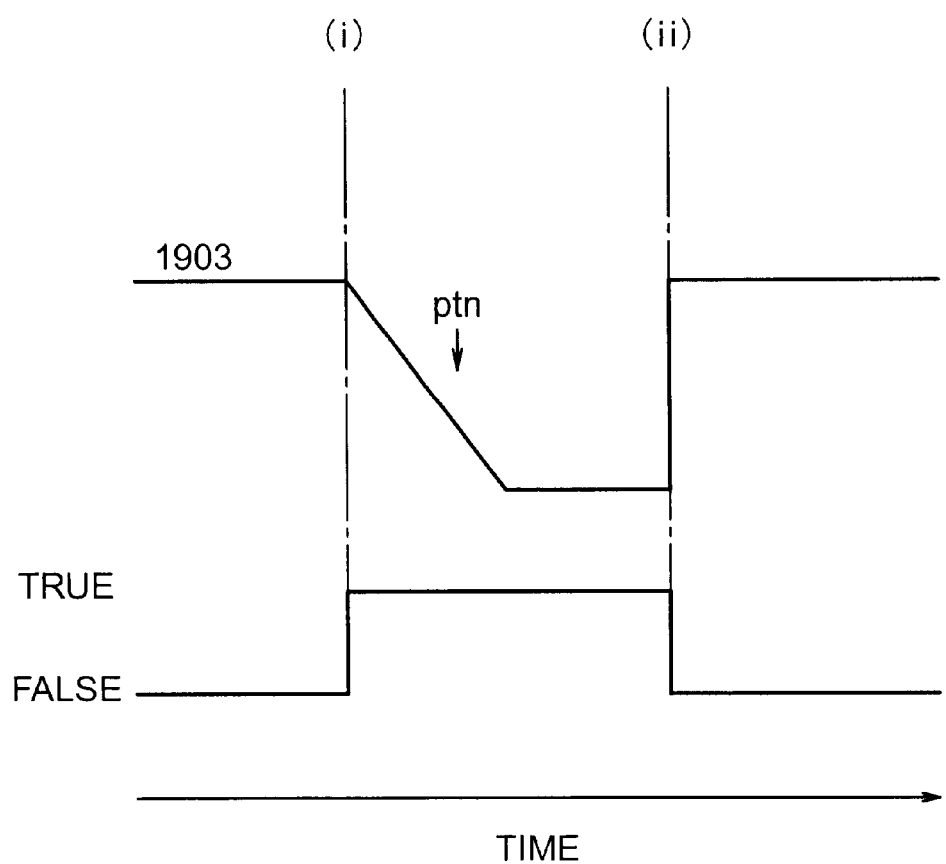
FIG. 8 is a diagram showing an operation according to the second method using the limit range setting means in the steering device for a vehicle according to Embodiment 1 of the present invention.

FIG. 7 is a diagram for explaining a second method of setting the limit value by the limit range setting means 19 in the steering device for a vehicle. FIG. 8 is a diagram showing the operation of a condition decision means in the second method.

In the second method, as shown in FIG. 8, the limit range setting means 19 gradually starts reducing the limit value 1903 according to a predetermined pattern ptn at a time point (i) when the following conditions are satisfied: the deviation between the target wheel steering angle 1301 and the wheel steering angle 1101 is equal to or smaller than a first predetermined value; the value of the first-order differential of the target wheel steering angle 1301 is equal to or smaller than a second predetermined value; the value of the first-order differential of the wheel steering angle 1101 is equal to or smaller than a third predetermined value; and the value of the first-order differential of a steering wheel angle 1201 is equal to or smaller than a fourth predetermined value, that is, at the time point (i) when the decision value of a condition decision means 1904 changes from "false" to "true". At a time point (ii) when the decision value again changes to "false", the limit value 1903 becomes large. When the above-described conditions are not satisfied, the limit range setting means 19 sets the limit value 1903 so large that an output 1603 of the first reaction torque control means 16 is not limited.

The condition that the deviation between the target wheel steering angle 1301 and the wheel steering angle 1101 be equal to or smaller than the first predetermined value is for priority of control of the wheel steering angle, as described above. It is a condition for increasing the limit value 1903 set by the limit range setting means 19.

The conditions that the value of the first-order differential of the target wheel steering angle 1301 is equal to or smaller than the second predetermined value, that the value of the first-order differential of the wheel steering angle 1101 is equal to or smaller than the third predetermined value, and that the value of the first-order differential of the steering wheel angle 1201 is equal to or smaller than the fourth predetermined value are conditions for making the first reaction torque control means 16 perform reaction control to ensure with priority that the driver can feel improved steering performance, for example, when the driver is operating the steering wheel 1 or when the wheels turned for steering 7a and 7b are moved according to a steering request 20 from another system.

This is because while the wheel steering angle control electric motor 901 is being controlled by the wheel steering angle control means 14 to change the wheel steering angle of the wheels 7a and 7b, this control and reaction torque control by the second reaction torque control means 17 using the same wheel steering angle control electric motor 901 interfere with each other. Thus, by setting the above-described conditions, reaction control by the second reaction torque control means 17 is limited to a steady state, e.g., a state in which a certain steering angle is maintained, thus reducing energy consumption.

Figure 9:
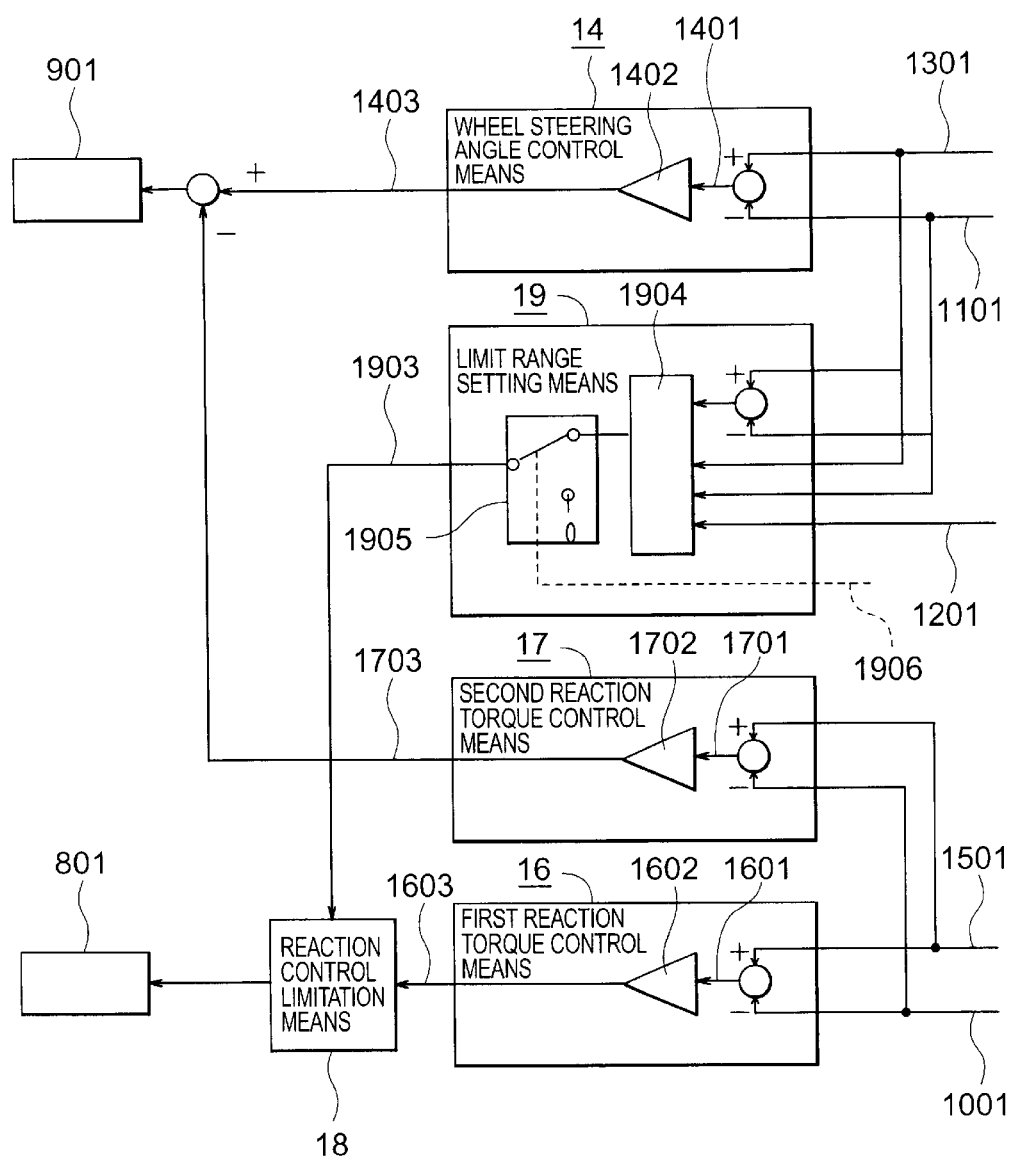
FIG. 9 is a diagram for explaining a third method using the limit range setting means in the steering device for a vehicle according to Embodiment 1 of the present invention.
Figure 10:
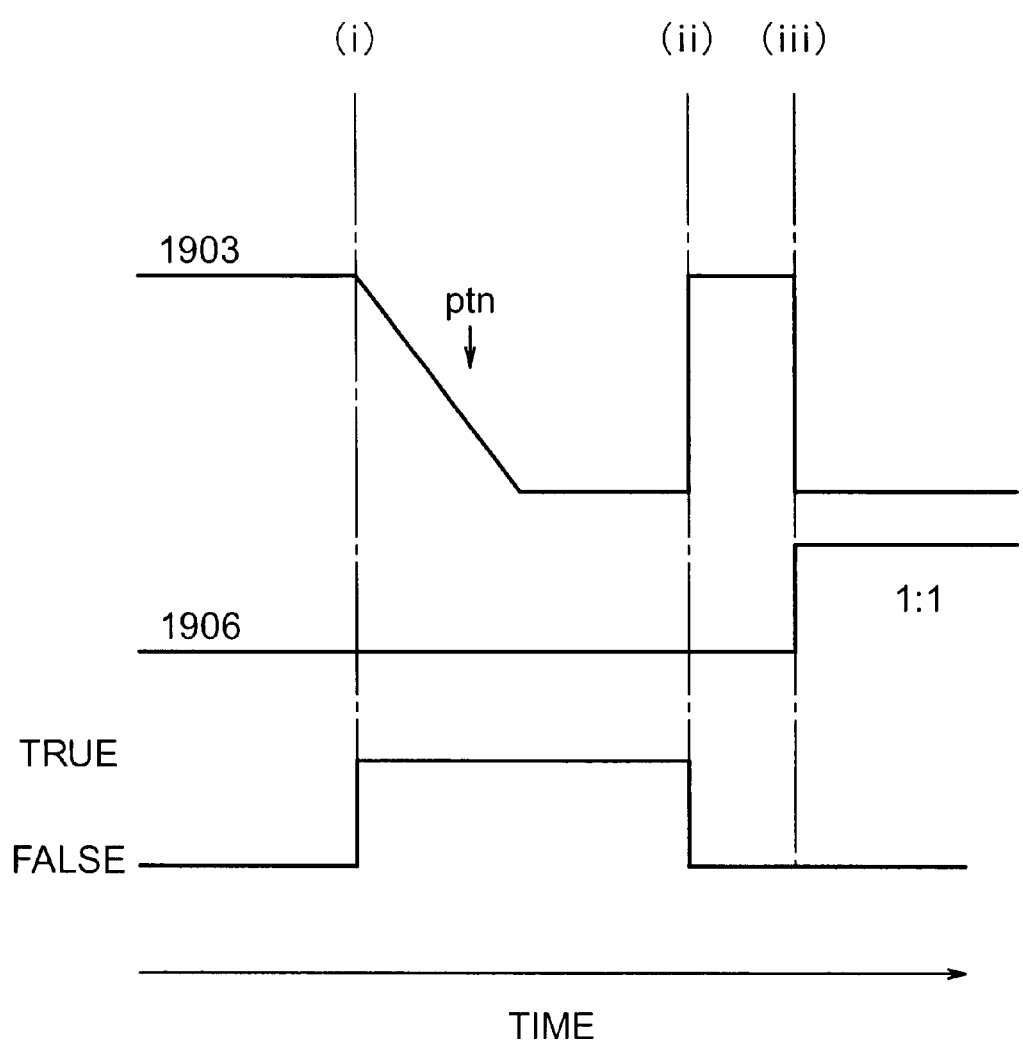
FIG. 10 is a diagram showing an operation according to the third method using the limit range setting means in the steering device for a vehicle according to Embodiment 1 of the present invention.
Figure 11:
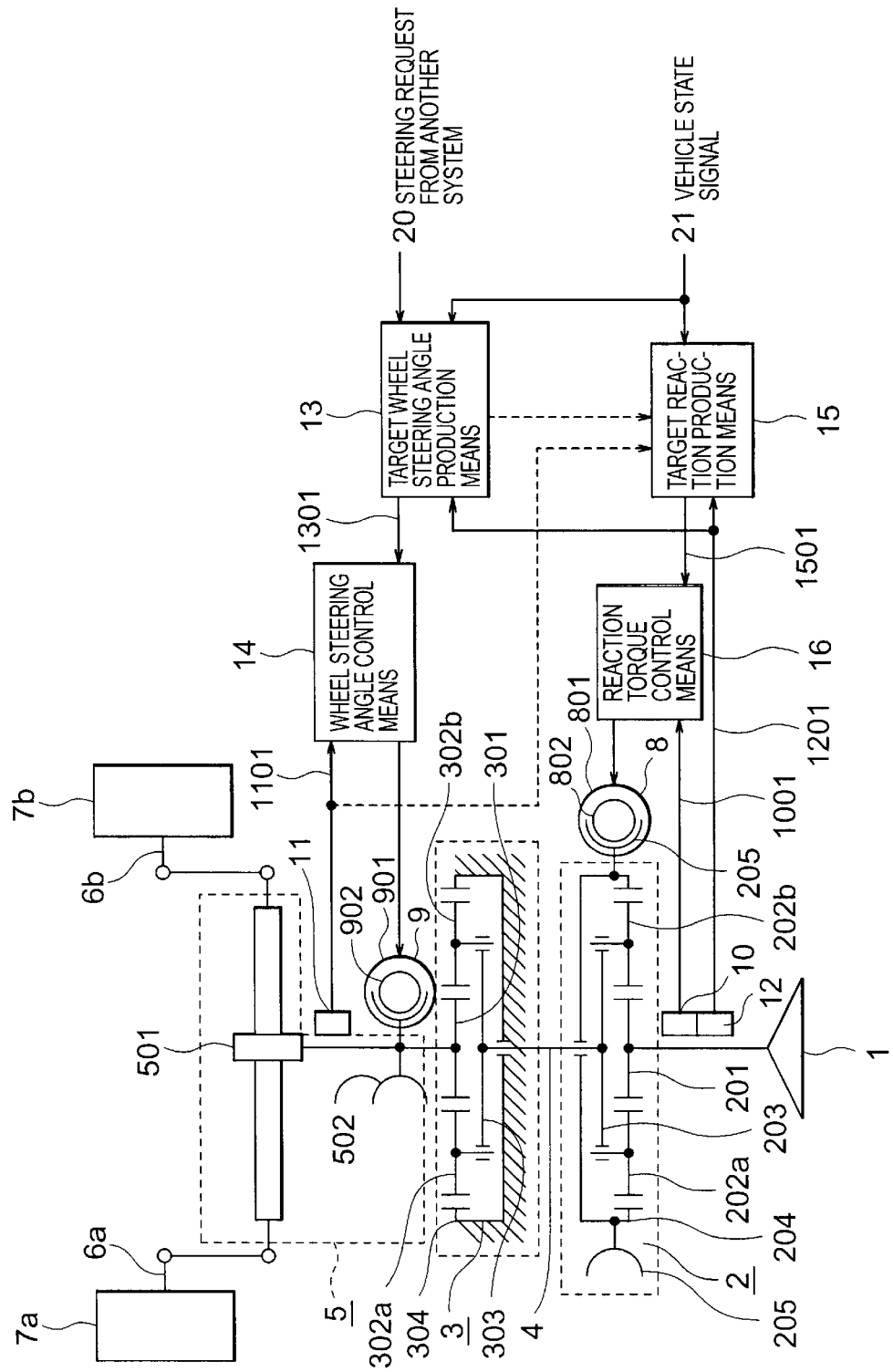
FIG. 11 is a diagram showing the construction of a conventional steering device for a vehicle.

FIG. 9 is a diagram for explaining a third method of setting the limit value by the limit range setting means 19 in the steering device for a vehicle. FIG. 10 is a diagram showing the operation of a condition decision means in the third method.

The third method is characterized by adding to the above-described second method a signal 1906 indicating that the steering angle 1201 of the steering wheel 1 and the target wheel steering angle 1301 are in a 1:1 relationship and a changeover switch 1905 for forcibly setting the limit value 1903 to zero.

That is, as indicated at a time point (iii) in FIG. 10, if the steering angle 1201 of the steering wheel 1 and the target wheel steering angle 1301 are in a 1:1 relationship according to the state of signal 1906, the limit value 1903 set by the limit range setting means 19 is reduced to zero to enable reaction control to be performed by the second reaction torque control means 17 alone.

In the sub-steering mechanisms 2 and 3 used in this embodiment, if the control output to the reaction motor 801 is set to zero, the steering wheel 1 and the steering mechanism 5 are set in a mechanical 1:1 correspondence with each other. Therefore it is possible to give the wheels turned for steering 7a and 7b steering angles according to the amount of steering operation of the steering wheel 1 without using the wheel steering angle control means 14. Thus, control corresponding to ordinary electric motor assisted power steering, i.e., control always in the state shown in FIG. 3, can be performed by using only the second reaction torque control means 17 to reduce energy consumption.

The present invention has been described by way of examples with respect to a case where two planetary gear mechanisms are combined to form a sub-steering mechanism. However, the present invention is not limited to this sub-steering mechanism construction. The present invention can be applied to any sub-steering mechanism if the mechanism is capable of mechanically adding two rotational angles together.

What is claimed is:

1. A steering device for a vehicle comprising:

a steering wheel operated by a driver;

a sub-steering mechanism for mechanically adding an auxiliary steering angle to a turning angle of the steering wheel;

a steering mechanism for turning wheels for steering;

a reaction control mechanism for giving the steering wheel a reaction torque by energizing the sub-steering mechanism with a drive torque;

a wheel steering angle control mechanism for driving the steering mechanism;

a reaction torque detection means for detecting the reaction torque produced in the steering wheel;

a wheel steering angle detection means for detecting wheel steering angles of the wheels;

a steering wheel steering angle detection means for detecting a steering wheel angle when the steering wheel is operated;

a target wheel steering angle production means for producing a target wheel steering angle on the basis of the steering wheel angle detected by the steering wheel steering angle detection means;

a wheel steering angle control means for controlling the wheel steering angles of the wheels turned for steering by driving the wheel steering angle control mechanism so that the wheel steering angles detected by the wheel steering angle detection means and the target wheel steering angle produced by the target wheel steering angle production means coincide with each other;

a target reaction production means for producing a target reaction on the basis of the steering wheel angle detected by the steering wheel steering angle detection means;

a first reaction torque control means for controlling the reaction torque produced in the steering wheel by driving the reaction control mechanism so that the reaction torque detected by the reaction torque detection means and the target reaction produced by the target reaction production means coincide with each other;

a second reaction torque control means for compensating an output from the wheel steering angle control means so that the reaction torque detected by the reaction torque detection means and the target reaction produced by the target reaction production means coincide with each other;

a reaction control limitation means for limiting an output from the first reaction torque control means on the basis of a limit value; and limit range setting means for setting the limit value used by the reaction control limitation means.

2. A steering device for a vehicle according to claim 1, wherein said limit range setting means sets the limit value on the basis of a deviation between the wheel steering angle detected by said wheel steering angle detection means and the target wheel steering angle produced by said target wheel steering angle production means.

3. A steering device for a vehicle according to claim 1, wherein said limit range setting means gradually reduces the limit value according to a predetermined pattern when following conditions are satisfied: a deviation between the wheel steering angle detected by said wheel steering angle detection means and the target wheel steering angle produced by said target wheel steering angle production means is equal to or smaller than a first predetermined value; a value of a first-order differential of the target wheel steering angle is equal to or smaller than a second predetermined value; a value of a first-order differential of the wheel steering angle is equal to or smaller than a third predetermined value; and a value of a first-order differential of the steering wheel angle detected by said steering wheel angle detection means is equal to or smaller than a fourth predetermined value, and wherein if the conditions are not satisfied, said limit range setting means sets such a limit value that the output from said first reaction torque control means is not limited.

4. A steering device for a vehicle according to claim 3, wherein if the steering wheel angle detected by said steering wheel steering angle detection means and the target wheel steering angle are in a 1:1 relationship with each other, said limit range setting means outputs such a limit value that reaction control by said first reaction torque control means cannot be performed.

* * * * *